Figure 1:
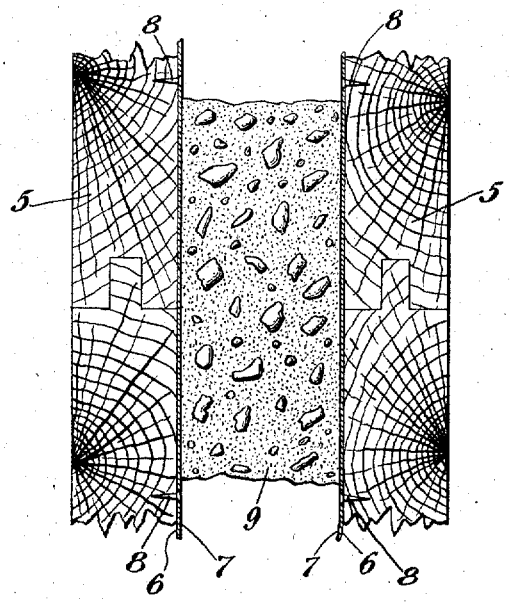

Oct. 29, 1929. N. C. JOHNSON Re. 17,476

PROCESS OF AND MEANS FOR CEMENTITIOUS MOLDING

Original Filed June 17, 1925

Inventor
Nathan C. Johnson
By his Attorneys
Ward & Crosby

Reissued Oct. 29, 1929

Re. 17,476

UNITED STATES PATENT OFFICE

NATHAN C. JOHNSON, OF ENGLEWOOD, NEW JERSEY

PROCESS OF AND MEANS FOR CEMENTITIOUS MOLDING

Original application filed June 17, 1925, Serial No. 37,625. Divided and this application filed February 14, 1927, Serial No. 168,125. Original No. 1,668,723, dated May 8, 1928. Application for reissue filed August 1, 1928. Serial No. 296,821.

This invention relates to products for surfacing and molding cementitious materials such as concrete and to processes for making and utilizing such products.

The use of concrete has been greatly restricted by reason of unsightly form marks and other surface characteristics which in the past could only be removed or obscured by expensive or undesirable methods. Heretofore, in attempts to remove the undesirable surface marks, strong mineral acids or other chemicals have been used for scrubbing down set or hardened concrete, and in other ways for giving a desirable appearance by exposing the aggregate and eating away the cement surface, but this is in some cases impractical. Costly and inefficient mechanical methods have had a limited use.

With the present invention the form marks and other undesirable surface characteristics may be obliterated and a rough textured concrete surface with the aggregate exposed to any desired extent may be provided in a reliable, cheap, and easy manner, but without affecting or endangering the strength of the concrete body. This is very desirable for many purposes, such for example as to give a pleasing rough finish—pebble- or rock-like surface—to concrete, or to permit a better bonding of plaster or cement to a concrete surface; or to bond together in a manner heretofore impossible two portions of a concrete structure, such as a wall, that are poured at different times, since with this surfacing treatment, the second pouring will unite and bond itself perfectly to the rough and clean surface of the first portion to set.

Also, according to this invention, the outer surface layers of the concrete which are generally over rich in cement may be removed with the resulting elimination of the harmful cracks which often occur in this rich cement surface due to the fact that it has a different coefficient of expansion from that of the main body of the concrete.

According to the present invention I provide a suitable concrete set-inhibiting reagent or "medication" substance or substances which will render the cement at the surface layers unsound, thus preventing or very greatly delaying the setting of the surface layer of the concrete. According to one form of the invention this "medication" substance may be applied to a suitable carrier or backing such as a web of paper or fabric, either felted or woven, or other fibrous sheet material which may be conveniently handled and used as a lining for the concrete forms or otherwise placed with the "medication" more or less exposed to the concrete. Furthermore, if desired the "medication" substance may be embodied in a suitable colloidal composition or vehicle such that a predetermined limited quantity of the "medication" substance is gradually and uniformly delivered up to the concrete by dialysis.

When concrete is poured into the forms provided with "medicated" linings or coatings of the type above indicated, the reagent leaves the carrier and/or the colloidal vehicle and is slowly diffused into the concrete, thus affecting the surface layers of the cement to the desired or predetermined depth in a manner to change the composition of the cement by balancing the same, thereby rendering it unsound but without the reagent affecting the cement lying beyond the predetermined desired depth that was intended to be affected. After the forms and the carrier are removed, the affected cement layers may be easily brushed or washed away leaving the rough textured surface.

The invention comprises the novel product as above referred to and also the process of manufacturing and applying such product to the treatment of a concrete body.

Figure 2:
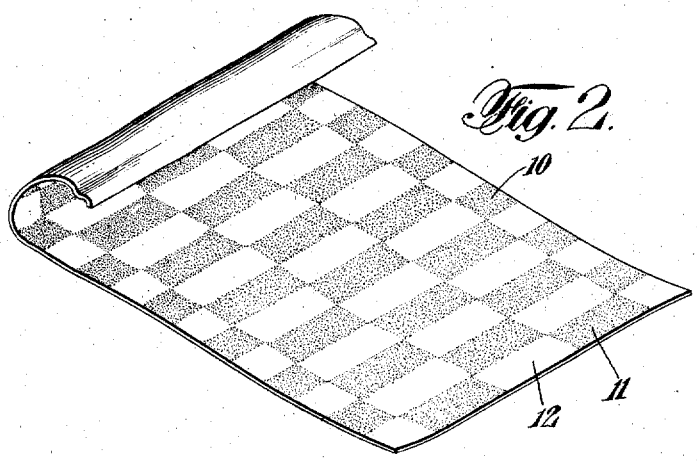

In the drawings Fig. 1 is a view illustrating a body of concrete and the accompanying forms therefor, showing one manner of using my invention in practice; and Fig. 2 is a view illustrating the application of the set-inhibiting composition to a carrier of sheet material.

Referring to Fig. 1, suitable forms of well known construction are indicated at 5. Upon these forms a carrier or backing of sheet material 6 is provided and has its surface, which is adapted to contact with the concrete, treated with a set-inhibiting composition as indicated at 7. The sheet material or backing may be secured to the forms by an adhesive or by the use of nails or tacks, as indicated at 8, or both. The concrete body indicated at 9 may be of any of the well known compositions and is poured into the forms in the usual manner.

The main body of the concrete will become set in the usual manner, but, at the surfaces of the concrete which contact with the set-inhibiting material 7, the setting action will be prevented or greatly delayed. Accordingly, after the main body of the concrete becomes set, the forms 5, together with the sheet material 6, may be removed before the surface layers of the concrete are hardened. These surface layers may then be removed by brushing or washing down or may be removed merely by the action of rain washing and weathering. The "medication" substance acts to prevent the normal setting action of the cement between and around the particles of aggregate but only to a limited and controlled depth, thereby making evident a fine etched appearance and conferring a pleasing texture and relief.

Many different and widely varying substances may be used as a set-inhibiting reagent or "medication"; for example, they may consist either of mixtures of sugar products, of metallic salts or of glucocides or glucose, molasses, dextrines either with or without metallic salts, or metallic salts either with or without other substances. Such reagents or compositions thereof may be applied in thin layers directly upon the flexible backing of sheet material or preferably they may be embodied in suitable colloidal vehicles to form compositions, one example of which will now be described.

A mixture of orange shellac gum and manila gum dissolved in suitable quantities of alcohol and with or without waxes is prepared with the desired consistency to form a tenacious adhesive colloidal vehicle. For this purpose about 2 pounds of the shellac and about 2¼ pounds of the manila gum may be dissolved in about 3 quarts of alcohol. To this colloidal vehicle a suitable reagent or reagents or "medication" is added which will have the property of inhibiting the normal setting action of a concrete mixture to a limited depth when applied to the surface thereof. Among the reagents or "medication" substances which may be used in this connection are aluminum chloride, magnesium saccharate and magnesium chloride in suitable proportions, such for example as aluminum chloride ¼ oz., magnesium saccharate 6½ oz., magnesium chloride 2 oz., these metallic salts being mixed with a small quantity of water, say one-half pint. A composition made according to this formula and with these amounts will produce about one gallon of the colloidal substance. Greater quantities of the reagents or "medication" will affect greater depths from the concrete surface by reacting with greater quantities of the cement if such action is desired.

While various compositions or emulsions of water-distensible colloids may be used, it is desirable in commercial work that the "medication" be carried in a vehicle which is insoluble and/or not distensible except in the alkaline waters such as are produced in concrete and pervade the concrete during the reaction between the water and Portland cement. Another example of such a water insoluble body or vehicle is casein, either with or without formaldehyde.

The set-inhibiting material either with or without the colloidal vehicle may be brushed, printed on, or otherwise spread upon the backing of sheet material and is preferably allowed to substantially dry out to form a toughened flexible thin layer; or in some instances it may be found desirable to saturate the backing with the reagent.

As a web of backing material, paper or inexpensive cloth may be used or in some instances it may be found desirable to use a backing of sheet metal, expanded metal or wire screening in order to produce various desirable effects and to provide a backing that may be used more than once. Furthermore, the set-inhibiting material may be applied to the backing so as to produce figured or pattern effects, as well as to remove the entire surface layer. In the example shown in Fig. 2 a web of material 10 has areas as at 11 treated with the set-inhibiting material and alternate areas 12, which are untreated, thus simulating a brickwork design. By using such a product a representation of the design will be inscribed upon the surface of the concrete body, the untreated surface areas being revealed in relief.

Although in the drawings the product is illustrated as used upon a vertical wall, it will be understood that the same or similar products may be used in other types of construction, such as for instance, ceiling constructions where a finished surface is desired. It may also be used in top surface construction, such as on sidewalks, floors, porch floors and the like. Also, where it is desired to securely bond one section of a concrete structure to another section which is to be poured later, a rough surface for bonding purposes may be formed in accordance with this invention by treating the surface to expose clean aggregate particles which will affix themselves within the concrete body later poured thereon and make possible a durable bonding action.

This application comprises a division of the invention disclosed in my Patent No. 1,637,-321, issued July 26, 1927, for Method of and composition for treating concrete, the application for which was Ser. No. 37,625 and was filed June 17, 1925, said application having been in turn a continuation in part of my application Ser. No. 690,215, filed February 2, 1924. Further features of the invention are claimed in my two copending reissue applications executed and filed as of even dates herewith, and entitled respectively, "Means for cementitious molding" and "Materials for treating concrete and the like and process for using same".

While I have described my invention in considerable detail and with respect to preferred forms of the product embodying the invention, and the preferred methods or processes for making and using the same, it will be understood by those skilled in the art, after having understood my invention, that various changes and modifications may be made without departing from the spirit and scope of the invention, and I aim in the appended claims to cover all such modifications and changes as come within the spirit of the invention.

What I claim as new and desire to secure by Letters Patent is:

1. The combination of a mold for cementitious material, a carrier located adjacent to a molding surface of said mold and a cement destroying composition carried by said carrier on that surface which is adapted for contact with the cementitious material when the mold is filled.

2. The combination of a mold for cementitious material, a fibre backing located in surface engagement with a molding surface of said mold and a cement destroying composition carried by said backing on that surface which is adapted for contact with the cementitious material when the mold is filled.

3. The combination of a mold for casting cementitious material into the form of a wall, a paper carrier located in surface engagement with an inner surface of said mold and a cement destroying composition carried by said paper in a manner to contact with said cementitious material at one surface of the wall formed thereby.

4. Means adapted for use in molds for molding cementitious material comprising a carrier of pliable material and a cement destroying composition carried by said carrier on that surface which is adapted for contact with the cementitious material when the mold is filled.

5. Means adapted for use in molds for molding cementitious material comprising a roll of building paper and a cement destroying composition carried by said paper on that surface which is adapted for contact with the cementitious material when the mold is filled.

6. Means adapted for use in molds for molding cementitious material comprising a carrier of pliable material and a cement destroying composition in the form of a predetermined design carried by said carrier on that surface which is adapted for contact with the cementitious material when the mold is filled.

7. The combination of a mold for casting cementitious material, a fibre carrier positioned contiguous to the inner surface of said mold, said carrier having a cement destroying composition on the surface thereof adapted to make contact with said cementitious material and means for temporarily securing said carrier to said mold to position it during the mold-filling operation and to permit of its removal after the mold has been opened.

8. Means for acting upon concrete surfaces during the setting thereof to eliminate from the concrete body the surface layer, which comprises a carrier of fibrous material bearing a thin layer of a colloidal vehicle in which is incorporated a cement destroying composition.

9. In combination a sheet of flexible material bearing a thin layer of a composition for treating concrete surfaces to eliminate the surface layer of the concrete, which composition comprises a reagent material which will prevent the setting of the cement of the concrete with which it contacts or substantially delay the setting of the same beyond the period in which other portions of said cement out of contact with said reagent will set.

10. In combination a sheet of flexible material bearing a thin layer of a composition for treating concrete surfaces to eliminate the surface layer of the concrete, which composition comprises a reagent material which will prevent the setting of the cement of the concrete with which it contacts or substantially delay the setting of the same beyond the period in which other portions of said cement out of contact with said reagent will set, and also comprising a colloidal vehicle in which the reagent material is incorporated.

11. In combination a sheet of flexible material bearing a thin layer of a composition for treating concrete surfaces to eliminate the surface layer of the concrete, which composition comprises a colloidal vehicle in which is incorporated a reagent material capable of reacting upon the cement of the concrete to unbalance the composition of the same and render it unsound or non-setting, the said colloidal composition having the property of being insoluble in plain or ordinary water, but distensible or soluble in alkaline waters extruded from wet concrete.

12. A product as described in claim 11, characterized by the fact that the colloidal vehicle comprises a gum substance.

13. A product as described in claim 11, characterized by the fact that the colloidal vehicle comprises a resinous substance distensible in alkaline waters.

14. A product for treating concrete surfaces to eliminate the surface layer of the concrete, which comprises a composition containing a reagent material which will prevent the setting of Portland cement, said material being incorporated in a colloidal vehicle comprising gum dissolved in a solvent which enables the reagent to be incorporated with the colloidal vehicle without precipitation of the gum, said composition being applied in a thin layer to a flexible backing.

15. A product as described in claim 14, characterized thereby that the colloidal vehicle comprises dissolved orange shellac and manila gum.

16. A product for treating concrete surfaces to eliminate the surface layer of the cement thereof, which comprises a backing of paper or the like bearing a thin layer of a composition containing a reagent material which will prevent the setting of the cement with which it comes into contact or substantially delay the setting of the same beyond the period in which other portions of the cement out of contact with said reagent will set, said composition being substantially free of any mineral acid.

17. As an article of manufacture, a web of material to be used as a lining for concrete forms, having a concrete set-inhibiting material applied thereto.

18. As an article of manufacture, a web of material to be used as a lining for concrete forms, having applied to a surface thereof a non-volatile vehicle containing a concrete set-inhibiting substance.

19. As an article of manufacture, a lining for concrete forms, having on a surface thereof a dried vehicle containing a concrete set-inhibiting substance.

20. Process of forming concrete structures which consists in applying to the concrete forms a web of lining material bearing a concrete set-inhibiting composition on the surface thereof which is adapted for contact with the concrete, pouring the concrete mixture into the forms against said set-inhibiting composition, allowing the concrete to at least partially set, then removing the forms and lining material and the surface layers of the concrete which have been acted upon by said set-inhibiting composition.

21. Process of forming concrete structures with designs inscribed thereon, which consists in applying to the concrete forms a web of lining material bearing a concrete set-inhibiting composition on certain surface areas thereof following in outline the desired design, pouring the concrete mixture into the forms against said lining material and composition, allowing the concrete to at least partially set, then removing the forms and lining material, and finally removing from the body of concrete the surface layers of the areas which have been acted upon by said set-inhibiting composition to reveal the remaining areas in relief.

22. Process of forming concrete structures with arbitrary designs inscribed thereon, which consists in providing forms having certain surface areas thereof bearing a concrete set-inhibiting composition, said areas following the configuration of the desired design, pouring the concrete mixture into the forms against said composition, allowing the concrete to at least partially set, then removing the forms, and finally removing from the body of concrete the surface layers of the areas which have been acted upon by said set-inhibiting composition to reveal the remaining areas in relief.

23. Process of forming concrete structures which consists in applying to the concrete forms a web of lining material bearing a non-volatile vehicle incorporating a concrete set-inhibiting composition on the web surface which is adapted for contact with the concrete, pouring the concrete mixture into the forms against said set-inhibiting composition, allowing the concrete to at least partially set, then removing the forms and lining material and the surface layers of the concrete which have been acted upon by said set-inhibiting composition.

24. Process of forming concrete structures which consists in applying to the concrete forms a web of lining material bearing a dried vehicle incorporating a concrete set-inhibiting composition on the web surface which is adapted for contact with the concrete, pouring the concrete mixture into the forms against said set-inhibiting composition, allowing the concrete to at least partially set, then removing the forms and lining material and the surface layers which have been acted upon by said set-inhibiting composition.

25. Process of forming concrete structures which consists in applying to the concrete forms a web of lining material bearing a dried vehicle incorporating a concrete set-inhibiting composition on the web surface which is adapted for contact with the concrete, the vehicle being one insoluble in water other than alkaline water, pouring the concrete mixture into the forms against said set-inhibiting composition, allowing the concrete to at least partially set while the vehicle becomes distended by the alkaline waters extruded from the wet concrete, then removing the forms and lining material and the surface layers which have been acted upon by said set-inhibiting composition.

26. As an article of manufacture, a web of material to be used in the treatment of concrete surfaces, said material including a concrete set inhibiting substance to delay or prevent the setting of the cement at the surface layers of concrete when in contact therewith.

27. Means for treating surfaces of cementitious bodies comprising a web of material carrying a cement set inhibiting substance.

28. Means for treating surfaces of cementitious bodies comprising a layer of felted material carrying a cement set inhibiting substance.

29. Means for treating surfaces of cementitious bodies to produce a desired surface pattern or texture, comprising a web of material carrying a cement set inhibiting substance and formed according to the desired predetermined pattern.

30. Process of forming concrete structures which consists in applying to the surfaces of the concrete before the same have become fully set, a web of material carrying a set inhibiting substance, then after the main body of concrete has become hardened, removing said web of material and also the surface layers of cement which have been affected by said set inhibiting substance.

31. Process of treating surfaces of cementitious bodies to form the same with predetermined patterned or textured effects, which comprises applying to such surfaces before the same have become hardened, a web of material carrying a cement set inhibiting substance and formed according to the desired predetermined pattern, and then after the main body of concrete has become hardened, removing said web of material and also the surface layers of cement which have been affected by said set inhibiting substance.

In testimony whereof I have signed my name to this specification.

NATHAN C. JOHNSON.